(12) United States Patent
Loman et al.

(10) Patent No.: US 8,899,026 B2
(45) Date of Patent: Dec. 2, 2014

(54) ARRANGEMENT FOR INTRODUCING A LIQUID MEDIUM INTO EXHAUST GASES FROM A COMBUSTION ENGINE

(75) Inventors: Peter Loman, Sollentuna (SE); Daniel Norling, Huddinge (SE)

(73) Assignee: Scania CV AB (Publ) (SE)

( * ) Notice: Subject to any disclaimer, the term of this patent is extended or adjusted under 35 U.S.C. 154(b) by 85 days.

(21) Appl. No.: 13/823,876

(22) PCT Filed: Oct. 7, 2011

(86) PCT No.: PCT/SE2011/051200
§ 371 (c)(1),
(2), (4) Date: Mar. 15, 2013

(87) PCT Pub. No.: WO2012/050509
PCT Pub. Date: Apr. 19, 2012

(65) Prior Publication Data
US 2013/0174537 A1  Jul. 11, 2013

(30) Foreign Application Priority Data

Oct. 14, 2010  (SE) ....................................... 1051073

(51) Int. Cl.
*F01N 3/00* (2006.01)
*F01N 3/10* (2006.01)
*F01N 3/02* (2006.01)
(Continued)

(52) U.S. Cl.
CPC .............. *F01N 3/08* (2013.01); *F01N 2470/18* (2013.01); *B01F 5/045* (2013.01); *B01F 3/04049* (2013.01); *F01N 3/2066* (2013.01); *F01N 13/141* (2013.01); *F01N 2470/08* (2013.01); *F01N 2470/24* (2013.01); *F01N 2610/02* (2013.01); *F01N 2610/08* (2013.01); *F01N 2610/1453* (2013.01); *Y02T 10/24* (2013.01); *F01N 3/2892* (2013.01); *F01N 2240/20* (2013.01)
USPC ..................... 60/295; 60/303; 60/317; 60/324

(58) Field of Classification Search
CPC . F01N 3/2066; F01N 3/2892; F01N 2240/20; F01N 2470/08; F01N 2470/18; F01N 2470/24; F01N 2610/02; F01N 2610/1453; F01N 13/141; B01F 5/045
USPC .................................... 60/295, 303, 317, 324
See application file for complete search history.

(56) References Cited

U.S. PATENT DOCUMENTS

2006/0008397 A1   1/2006   Bruck ........................... 422/180
2008/0120019 A1   5/2008   Inoue et al. .................... 701/113
(Continued)

FOREIGN PATENT DOCUMENTS

EP           1 050 670        11/2000

OTHER PUBLICATIONS
International Search Report mailed Feb. 1, 2012 in corresponding PCT International Application No. PCT/SE2011/051200.

*Primary Examiner* — Audrey K Bradley
(74) *Attorney, Agent, or Firm* — Ostrolenk Faber LLP

(57) ABSTRACT

Arrangement for introducing a liquid medium into exhaust gases from a combustion engine, having a mixing duct, an injector for injecting the liquid medium into the mixing duct, and an inlet duct situated upstream of the mixing duct. The inlet duct has a first duct section which is annular in cross-section and a second duct section which is annular in cross-section. The second duct section is situated downstream of the first duct section and surrounds the mixing duct. The first duct section surrounds the second duct section. The mixing duct further has a flow reversal section via which an annular outlet of the first duct section is connected to an annular inlet of the second duct section and which is configured to reverse the direction of flow of the exhaust gases flowing through the inlet duct, to flow through the second duct section in a direction opposite to that of the exhaust gases in the first duct section.

14 Claims, 1 Drawing Sheet

Figure 1:
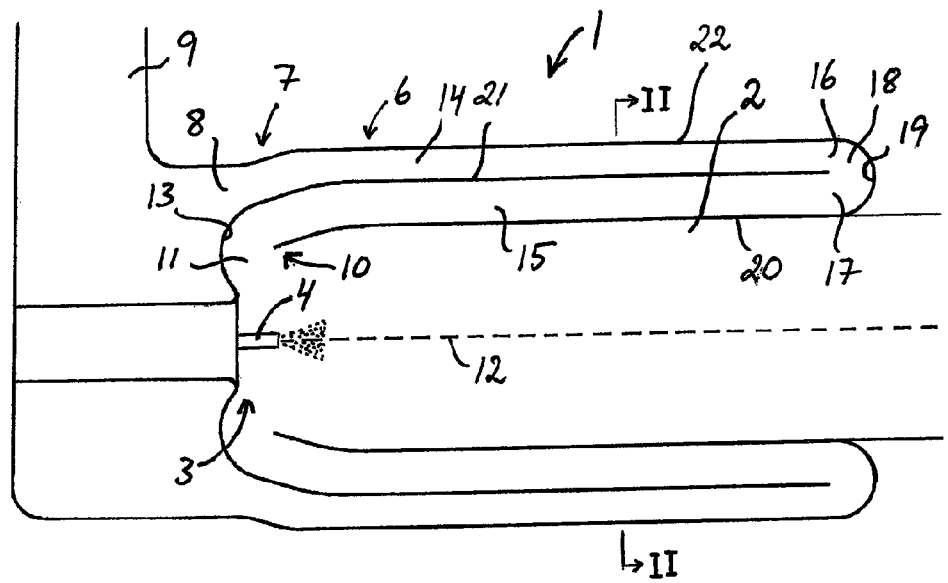
Figure 2:
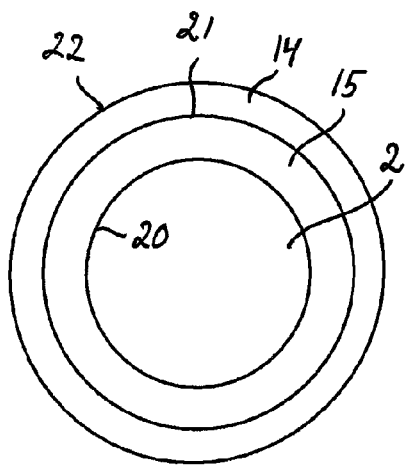

(51) Int. Cl.
*F01N 1/00* (2006.01)
*F01N 3/08* (2006.01)
*B01F 5/04* (2006.01)
*B01F 3/04* (2006.01)
*F01N 3/20* (2006.01)
*F01N 13/14* (2010.01)
*F01N 3/28* (2006.01)

(56) References Cited

U.S. PATENT DOCUMENTS

| 2010/0212301 | A1* | 8/2010 | De Rudder et al. | 60/299 |
| 2011/0061374 | A1* | 3/2011 | Noritake | 60/286 |
| 2011/0113759 | A1* | 5/2011 | Tilinski et al. | 60/295 |
| 2011/0120097 | A1* | 5/2011 | Dickerson et al. | 60/286 |

* cited by examiner

US 8,899,026 B2

ARRANGEMENT FOR INTRODUCING A LIQUID MEDIUM INTO EXHAUST GASES FROM A COMBUSTION ENGINE

The present application is a 35 U.S.C. §§371 national phase conversion of PCT/SE2011/051200, filed Oct. 7, 2011, which claims priority of Swedish Application No. 1051073-3, filed Oct. 14, 2010, the contents of which are incorporated by reference herein. The PCT International Application was published in the English language.

BACKGROUND OF THE INVENTION

1. Field of the invention

The present invention relates to an arrangement for introducing a liquid medium, e.g. urea, into exhaust gases from a combustion engine.

2. Related art

To meet prevailing exhaust cleaning requirements, today's motor vehicles are usually provided with a catalyst in the exhaust line to effect catalytic conversion of environmentally hazardous constituents of the exhaust gases to environmentally less hazardous substances. A method which has been employed for achieving effective catalytic conversion is based on injecting a reducing agent into the exhaust gases upstream of the catalyst. A reductive substance which forms part of, or is formed by, the reducing agent is carried by the exhaust gases into the catalyst and is adsorbed on active seats in the catalyst, resulting in accumulation of the reductive substance in the catalyst. The accumulated reductive substance may then react with and thereby convert an exhaust substance to a substance with less environmental impact.

Such a reduction catalyst may for example be of the SCR (selective catalytic reduction) type. This type of catalyst is hereinafter called an SCR catalyst. An SCR catalyst reduces $NO_x$ in the exhaust gases.

In the case of an SCR catalyst, a reducing agent in the form of urea solution is usually injected into the exhaust gases upstream of the catalyst. The injection of urea into the exhaust gases results in the formation of ammonia which then serves as the reductive substance which assists the catalytic conversion in the SCR catalyst. The ammonia accumulates in the catalyst by being adsorbed on active seats in the catalyst, and $NO_x$ present in the exhaust gases is converted to nitrogen gas and water when it is brought into contact in the catalyst with accumulated ammonia on the active seats in the catalyst.

When urea is used as the reducing agent, it is injected into the exhaust line in the form of a liquid urea solution via an injector. The injector comprises a nozzle via which the urea solution is injected under pressure into the exhaust line in the form of a finely divided spray. In many operating conditions of a diesel engine, the exhaust gases will be at a high enough temperature to be able to vaporise the urea solution so that ammonia is formed.

It is difficult, however, to avoid part of the urea solution supplied coming into contact with and becoming attached to the internal wall surface of the exhaust line in an unvaporised state. The exhaust line, which is often in contact with and cooled by surrounding air, will be at a lower temperature than the exhaust gases within the exhaust line. When a combustion engine is run in a uniform way for a period of time, i.e. during steady-state operating conditions, no appreciable variations in the exhaust flow occur and the urea solution injected into the exhaust gases will therefore reach substantially the same region of the exhaust line throughout said period of time. The relatively cool urea solution may cause local lowering of the temperature in that region of the exhaust line, which may lead to the formation in that region of a film of urea solution which is then entrained by the exhaust flow. When this film has moved a certain distance in the exhaust line, the water in the urea solution will boil away under the influence of the hot exhaust gases. Solid urea will remain and will be slowly vaporised by the heat in the exhaust line. If the supply of solid urea is greater than the amount vaporised, solid urea will accumulate in the exhaust line. If the resulting layer of urea becomes thick enough, the urea and its decomposition products will react with one another to form urea-based primitive polymers known as urea lumps. Such urea lumps may over time block an exhaust line.

It is therefore desirable that the injected urea solution be widely spread out in the exhaust gases so that it is prevented from concentrating in substantially the same region of the exhaust line. A good spread of the urea solution in the exhaust gases also facilitates its vaporisation.

For reasons of space it is not usually possible to have a rectilinear exhaust line between a combustion engine and an exhaust outlet of a motor vehicle. Before the exhaust gases reach the mixing duct in which injected urea solution is mixed with them and becomes vaporised, they therefore usually pass through one or more pipe bends. Their passage through a pipe bend results in an oblique distribution of the exhaust flow as seen in the plane perpendicular to the direction of flow. Bringing an injected spray of urea solution into contact with such an obliquely distributed exhaust flow hinders the spreading of the urea solution in the exhaust gases and at the same time increases the risk that the urea solution might concentrate on substantially the same wall region in the mixing duct.

SUMMARY OF THE INVENTION

The present disclosure proposes a solution to the above problem of obliquely distributed exhaust flow in a mixing duct in which liquid medium, e.g. urea, is injected into exhaust gases from a combustion engine.

An arrangement for achieving such a solution may comprise:

a mixing duct arranged to have exhaust gases flowing through it, an injector for injecting the liquid medium into the mixing duct at the centre of the upstream end of the mixing duct, and an inlet duct which is situated upstream of the mixing duct, has at its upstream end an inlet for receiving the exhaust gases, and has at its downstream end an outlet to the upstream end of the mixing duct in order to deliver the exhaust gases to the mixing duct.

The inlet duct comprises a first duct section which is annular in cross-section and which has at its downstream end an annular outlet, and a second duct section which is annular in cross-section, is situated downstream of the first duct section and surrounds the mixing duct. The second duct section is connected via its downstream end to the outlet of the inlet duct and has at its upstream end an annular inlet. The first duct section surrounds the second duct section. The inlet duct further comprises a flow reversal section via which the annular outlet of the first duct section is connected to the annular inlet of the second duct section and which is configured and arranged for reversing the direction of flow of the exhaust gases flowing through the inlet duct so that they are caused to flow through the second duct section in a direction opposite to that of the exhaust gases in the first duct section.

The aforesaid first and second duct sections of the inlet duct form a rotationally symmetrical labyrinth which the exhaust gases pass through before they are released into the mixing duct. When the exhaust gases pass through these duct sections of the inlet duct, oblique distributions of the exhaust flow take time to become equalised, so that the exhaust gases can be led into the mixing duct in a flow which is substantially uniformly distributed as seen in a cross-section through the mixing duct. This makes it possible to achieve an exhaust flow which is substantially evenly distributed around the spray of liquid medium injected into the mixing duct, resulting in good spreading of the liquid medium in the exhaust gases while at the same time preventing the medium from reaching the wall surfaces of the mixing duct in the region nearest to the injector. The result is that the small drops of liquid medium are widely spread out in the exhaust gases in the mixing duct before they have occasion to reach any wall surface of the mixing duct, thereby eliminating or at least substantially reducing the risk of the previously mentioned lump formation. The fact that the duct sections of the inlet duct run externally about one another and externally about the mixing duct also makes it possible for the arrangement to have a compact and space-saving configuration.

According to an embodiment of the invention, the mixing duct is bounded in radial directions by a tubular wall, and the second duct section of the inlet duct extends along the outside of this tubular wall. The exhaust gases which flow through this second duct section of the inlet duct will deliver heat to this tubular wall, the inside of which serves as an internal wall surface of the mixing duct. This counteracts cooling of this internal wall surface of the mixing duct, thereby hindering injected medium from becoming attached to this internal wall surface before being vaporised.

Other advantageous features of the arrangement disclosed herein are indicated by the description set out below.

BRIEF DESCRIPTION OF THE DRAWINGS

An embodiment of the aforesaid arrangement is described below in more detail on the basis of examples with reference to the attached drawings, in which:

FIG. 1 is a schematic longitudinal section through an embodiment of the arrangement; and FIG. 2 depicts a section along the line II-II in FIG. 1.

DETAILED DESCRIPTION OF EMBODIMENTS

FIG. 1 illustrates an arrangement 1 for introducing a liquid medium into exhaust gases from a combustion engine. The arrangement may for example be situated in an exhaust line upstream of an SCR catalyst in order to introduce a liquid reducing agent in the form of urea or ammonia into the exhaust line upstream of the SCR catalyst, or be situated in an exhaust post-treatment device in order to introduce a liquid reducing agent in the form of urea or ammonia upstream of an SCR catalyst which forms part of the exhaust post-treatment device.

The arrangement 1 comprises a mixing duct 2 configured to receive at its upstream end 3 exhaust gases from a combustion engine and to lead them towards an exhaust post-treatment unit, e.g. in the form of an SCR catalyst. The mixing duct 2 is thus arranged to have exhaust gases flowing through it.

The arrangement 1 further comprises an injector 4 adapted to inject the liquid medium under pressure in the form of a finely divided spray into the mixing duct 2 at the centre of the upstream end 3 of the mixing duct. The injector 4 may for example comprise an injection nozzle. The injector 4 is situated with advantage at the centre of the upstream end 3 of the mixing duct and is adapted to inject the liquid medium towards the downstream end of the mixing duct, as illustrated in FIG. 1.

Exhaust gases are led into the mixing duct 2 via an inlet duct 6 which is situated upstream of the mixing duct, has at its upstream end 7 an annular inlet 8 for receiving exhaust gases from an exhaust line 9 and at its downstream end 10 an outlet 11 leading to the upstream end 3 of the mixing duct in order to deliver exhaust gases to the mixing duct. The outlet 11 of the inlet duct is annular and extends around the centerline 12 of the mixing duct. The outlet 11 of the inlet duct leads to an annular guide surface 13 which extends around the centreline 12 of the mixing duct. This guide surface 13 is rounded concavely facing the downstream end of the mixing duct in order to cause the exhaust gases received from the inlet duct 6 to flow towards the downstream end of the mixing duct.

The inlet duct 6 comprises a first duct section 14 which is annular in cross-section and which has at its downstream end an annular outlet 16. The inlet duct 6 comprises also a second duct section 15 which is annular in cross-section, is situated downstream of the first duct section 14 and surrounds the mixing duct 2. The second duct section 15 is connected via its downstream end to the outlet 11 of the inlet duct and has at its upstream end an annular inlet 17. The first duct section 14 surrounds and is concentric with the second duct section 15. The duct sections 14, 15 are also concentric with the mixing duct 2.

The annular outlet 16 of the first duct section 14 is connected to the annular inlet 17 of the second duct section 15 via a flow reversal section 18 which forms part of the inlet duct and is configured to reverse the direction of flow of the exhaust gases flowing through the inlet duct 6 so that they are caused to flow through the second duct section 15 in a direction which is opposite to that of the exhaust gases in the first duct section 14 and opposite to that of the exhaust gases in the mixing duct 2. The flow reversal section 18 has an annular guide surface 19 which is rounded concavely in the direction of the inlet 17 to cause the exhaust gases received from the outlet 16 of the first duct section to flow towards the inlet 17 of the second duct section.

The mixing duct 2 is bounded radially by a tubular wall 20. The second duct section 15 of the inlet duct extends along the outside of the tubular wall 20. The first and second duct sections 14, 15 of the inlet duct are themselves demarcated from one another by a tubular dividing wall 21, and the first duct section 14 is bounded radially outwards by a tubular wall 22. In the embodiment illustrated, the guide surface 13 is a continuation of the dividing wall 21 and the guide surface 19 extends between the tubular walls 20, 22.

The spray of liquid medium is injected into the mixing duct 2 via the injector 4 and comes into contact in the mixing duct with the exhaust gases which flow into the mixing duct 2 via the outlet 11 of the inlet duct in a substantially symmetrical flow round this spray. The exhaust gases flowing into the mixing duct 2 prevent the liquid medium in the spray from coming into contact with the wall of the mixing duct in the region nearest to the injector 4 and carry the liquid medium with them downstream in the mixing duct 2. During its movement downstream in the mixing duct 2, the liquid medium spreads out in the exhaust gases and is vaporised by their heat.

The arrangement according to the invention is particularly intended for use in a heavy motor vehicle, e.g. a bus, a tractor vehicle or a truck.

The invention is of course in no way restricted to the embodiments described above, since many possibilities for modifications thereof may be adopted by a specialist in the field without having to deviate from the invention's basic concepts.

The invention claimed is:

1. An arrangement for introducing a liquid medium into exhaust gases from a combustion engine, comprising:
   a mixing duct arranged to have exhaust gases flowing through it;
   an injector for injecting the liquid medium into the mixing duct centrally at an upstream end of the mixing duct;
   an inlet duct which is situated upstream of the mixing duct, has at an upstream end thereof an inlet for receiving the exhaust gases and at a downstream end thereof an outlet for conducting the exhaust gases to the upstream end of the mixing duct in order to deliver the exhaust gases to the mixing duct;
   the inlet duct having a first duct section which is annular in cross-section and has at its downstream end an annular outlet;
   the inlet duct having a second duct section which is annular in cross-section, is situated downstream of the first duct section and surrounds the mixing duct, the second duct section being connected via its downstream end to the outlet of the inlet duct and having at its upstream end an annular inlet;
   said first duct section surrounding said second duct section; and
   the inlet duct further comprising a flow reversal section via which the annular outlet of the first duct section is connected to the annular inlet of the second duct section and which is configured and arranged to reverse the direction of flow of the exhaust gases flowing through the inlet duct so that said exhaust gases are caused to flow through the second duct section in a direction opposite to that of the exhaust gases in the first duct section.

2. An arrangement according to claim 1, wherein the mixing duct is bounded radially by a tubular wall, and wherein the second duct section of the inlet duct extends along the outside of this tubular wall.

3. An arrangement according to claim 1, wherein said first and second duct sections of the inlet duct are demarcated from one another by a tubular separating wall.

4. An arrangement according to claim 1, wherein the injector is centrally situated at the upstream end of the mixing duct and is configured to inject the liquid medium towards a downstream end of the mixing duct.

5. An arrangement according to claim 1, wherein said first and second duct sections of the inlet duct are demarcated from one another by a tubular separating wall.

6. An arrangement according to claim 1, wherein the second duct section and the mixing duct are concentric.

7. An arrangement according to claim 1, wherein the first duct section and the second duct section are concentric.

8. An arrangement according to claim 7, wherein the second duct section and the mixing duct are concentric.

9. An arrangement according to claim 1, wherein the inlet of the inlet duct is annular and extends around a centreline of the mixing duct.

10. An arrangement according to claim 9, wherein the outlet of the inlet duct leads to an annular guide surface which extends around the centreline of the mixing duct and is rounded so as to cause the exhaust gases received from the inlet duct to flow towards a downstream end of the mixing duct.

11. An arrangement according to claim 10, wherein the inlet of the inlet duct is annular.

12. An arrangement according to claim 1, wherein said flow reversal section has an annular guide surface which is rounded so as to cause the exhaust gases received from the outlet of the first duct section to flow towards the inlet of the second duct section.

13. An arrangement according to claim 12, wherein the first duct section and the second duct section are concentric.

14. An arrangement according to claim 13, wherein the second duct section and the mixing duct are concentric.

\* \* \* \* \*